(12) United States Patent
Brongersma et al.

(10) Patent No.: US 10,795,234 B2
(45) Date of Patent: Oct. 6, 2020

(54) MEMS ACTUATED HIGH INDEX OPTICAL ANTENNAS AND METAFILMS FOR LIGHT MANIPULATION AND CONTROL

(71) Applicant: The Board of Trustees of the Leland Stanford Junior University, Palo Alto, CA (US)

(72) Inventors: Mark L. Brongersma, Menlo Park, CA (US); Aaron L. Holsteen, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 248 days.

(21) Appl. No.: 15/956,695

(22) Filed: Apr. 18, 2018

(65) Prior Publication Data

US 2018/0299743 A1   Oct. 18, 2018

Related U.S. Application Data

(60) Provisional application No. 62/486,742, filed on Apr. 18, 2017.

(51) Int. Cl.
| | |
|---|---|
| *G02B 26/08* | (2006.01) |
| *G02F 1/29* | (2006.01) |
| *G02B 7/182* | (2006.01) |
| *G02B 5/08* | (2006.01) |
| *G02B 5/18* | (2006.01) |

(52) U.S. Cl.
CPC ............... *G02F 1/29* (2013.01); *G02B 5/08* (2013.01); *G02B 7/1822* (2013.01); *G02B 26/0808* (2013.01); *G02B 26/0841* (2013.01); *G02B 5/1809* (2013.01)

(58) Field of Classification Search
CPC ..... G02F 1/29; G02B 26/0808; G02B 26/0841; G02B 5/08; G02B 7/1822; G02B 5/1809
See application file for complete search history.

(56) References Cited

U.S. PATENT DOCUMENTS

2008/0024776 A1*   1/2008   Bratkovski .......... G01N 21/658
356/301

OTHER PUBLICATIONS

Byung-Wook Yoo et al. Optical phased array using high contrast gratings for two dimensional beamforming and beamsteering. Optics Express vol. 21, Issue 10, pp. 12238-12248 (2013).
Masashi Miyata et al. Electromechanically Tunable Plasmonic Nanowires Operating in Visible Wavelengths. ACS Photonics, 2016, 3 (12), pp. 2268-2274.

(Continued)

*Primary Examiner* — Euncha P Cherry
(74) *Attorney, Agent, or Firm* — Lumen Patent Firm

(57) ABSTRACT

A monolithic optical device for light manipulation and control at visible wavelengths includes a device layer deposited on an sacrificial layer deposited on a reflective substrate. The device layer comprises an elastic support structure and nanoscale optical antenna elements, arranged such that the nanoscale optical antenna elements are capable of moving vertically in response to application of an electrostatic potential between the device layer and the reflective substrate. The sacrificial layer joins the elastic support structure to the reflective substrate. The reflective substrate is reflective at optical wavelengths.

11 Claims, 18 Drawing Sheets

(56) References Cited

OTHER PUBLICATIONS

Yuan Hsing Fu et al. A Micromachined Reconfigurable Metamaterial via Reconfiguration of Asymmetric Split-Ring Resonators. Advanced Functional Materials. vol. 21, Issue18. Sep. 23, 2011. pp. 3589-3594.
Philipp Gutruf et al. Mechanically Tunable Dielectric Resonator Metasurfaces at Visible Frequencies. ACS Photonics, 2016, 3 (12), pp. 2268-2274.
Liberman et al. Fast, electrically tunable filters for hyperspectral imaging. Proc. SPIE 9070, Infrared Technology and Applications XL, 90702B (Jun. 24, 2014).
Jun-Yu Ou et al. An electromechanically reconfigurable plasmonic metamaterial operating in the near-infrared. Nature Nanotechnology vol. 8, pp. 252-255 (2013).
Nikolay I. Zheludev et al. Reconfigurable nanomechanical photonic metamaterials. Nature Nanotechnology, vol. 11, pp. 16-22 (2016).
Nikolay I. Zheludev et al. From metamaterials to metadevices. Nature Materials, vol. 11, pp. 917-924 (2012).

\* cited by examiner

Fig. 1B
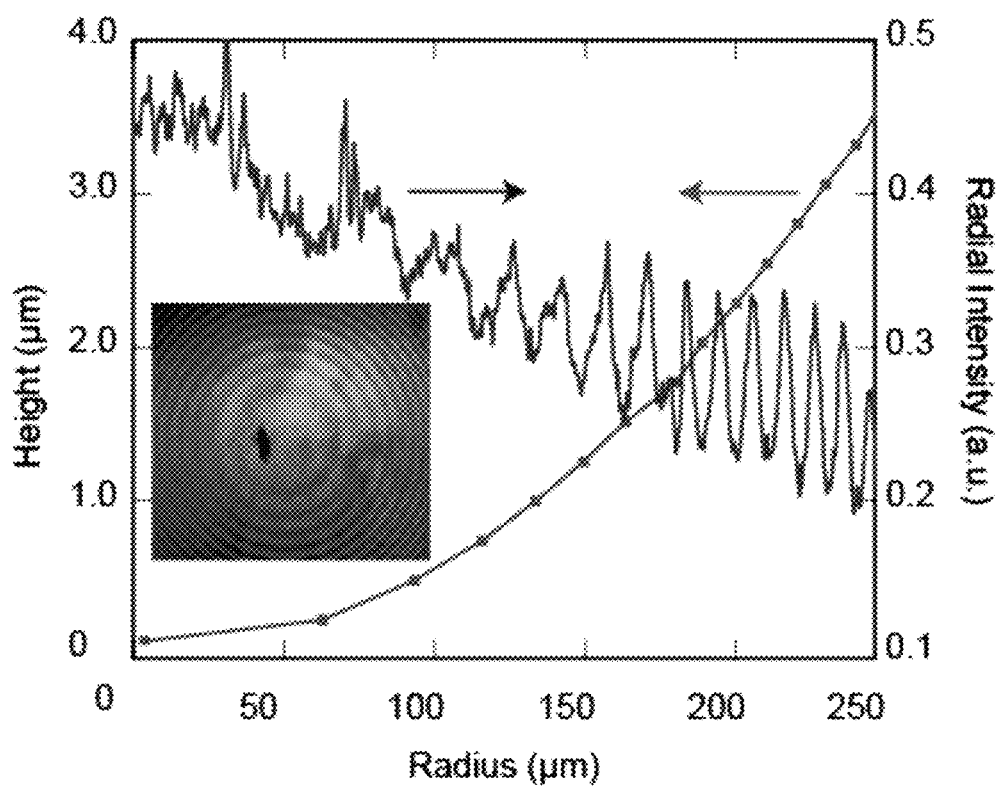
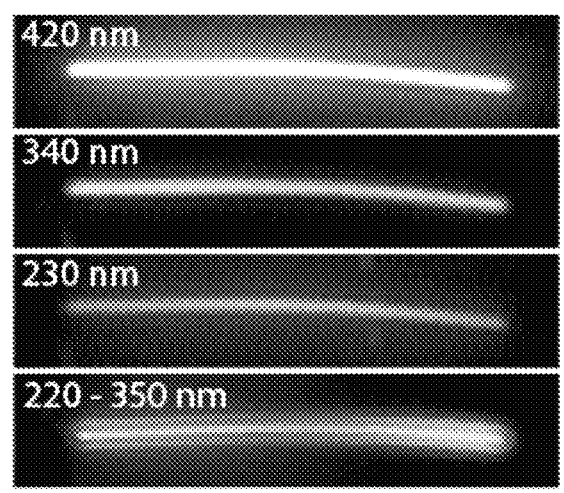
Fig. 1E

Fig. 1C     Fig. 1D
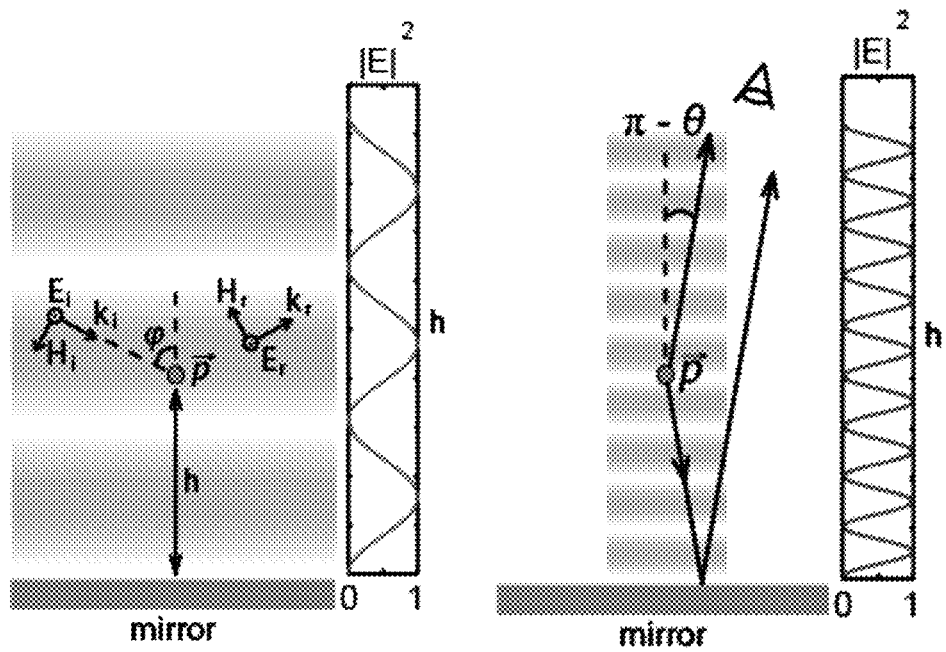
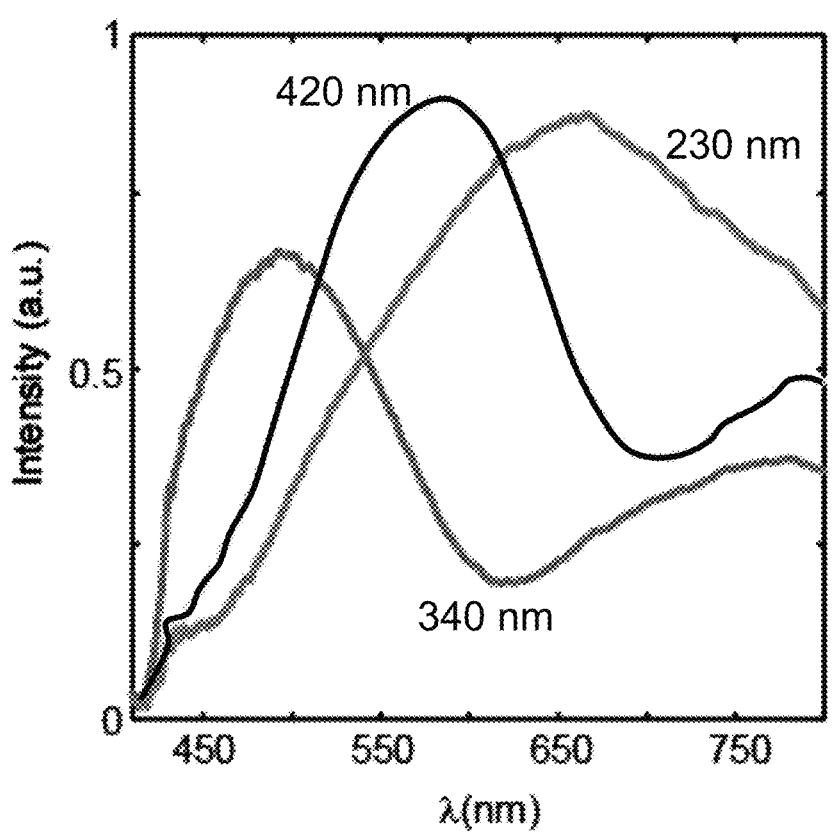
Fig. 1F

*Fig. 2A*
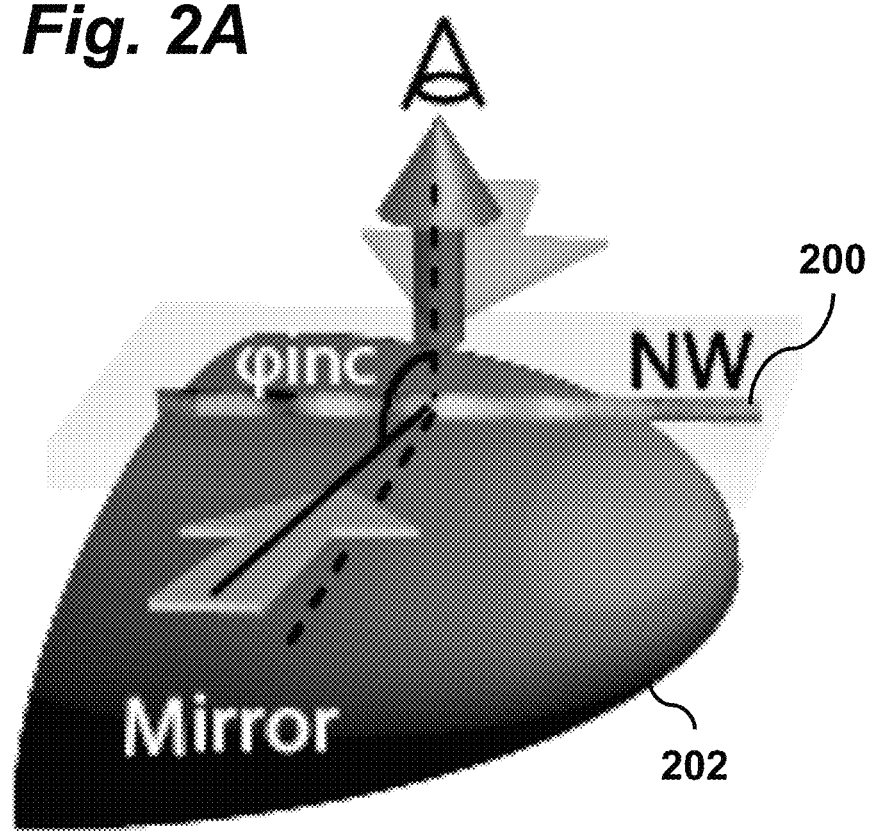
*Fig. 2B*
TE  TM
 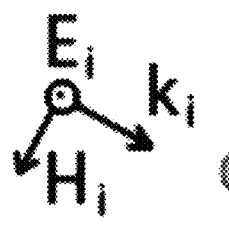

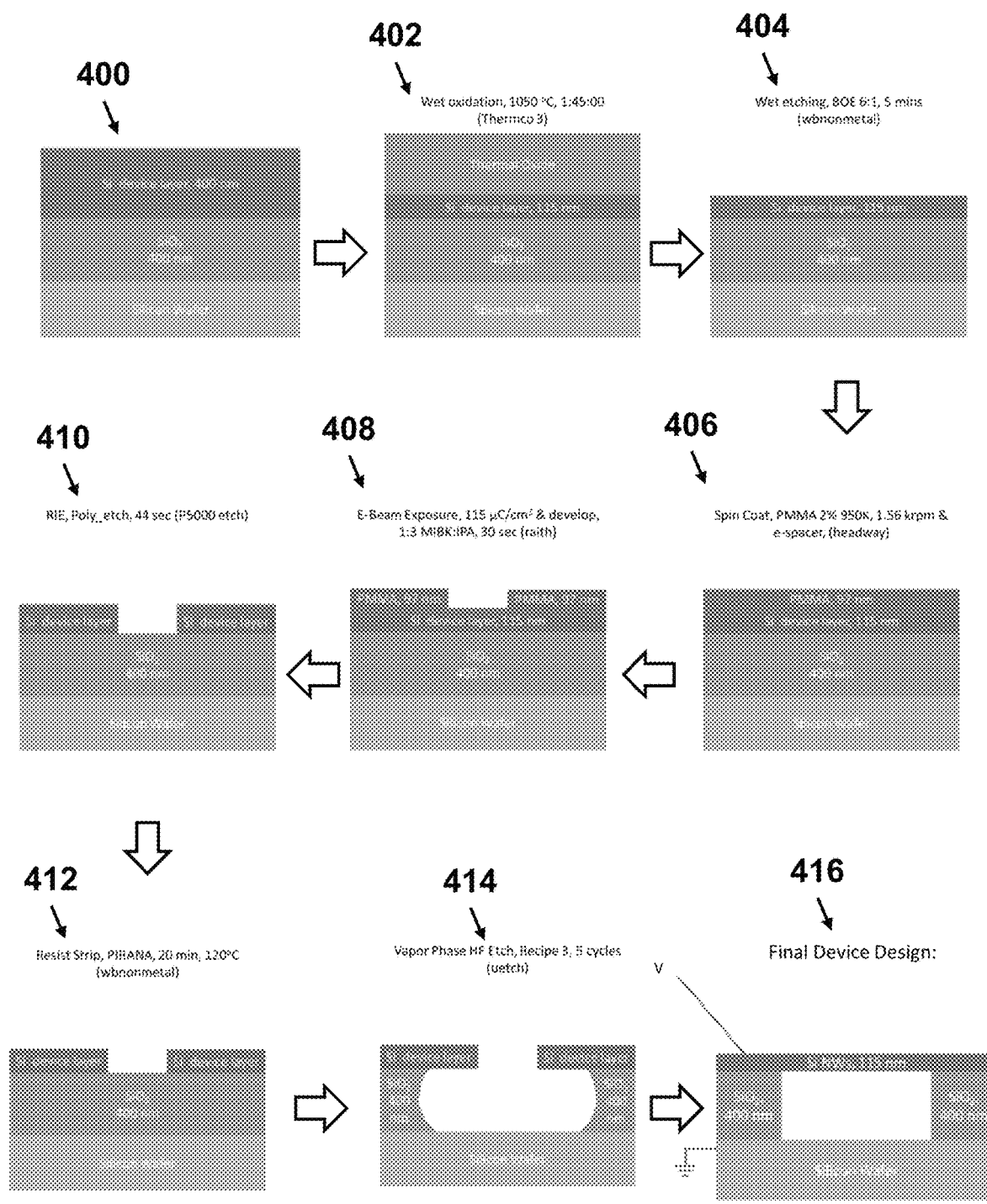

Bias = 0 V

↓

2.75 V

*Fig. 7A*
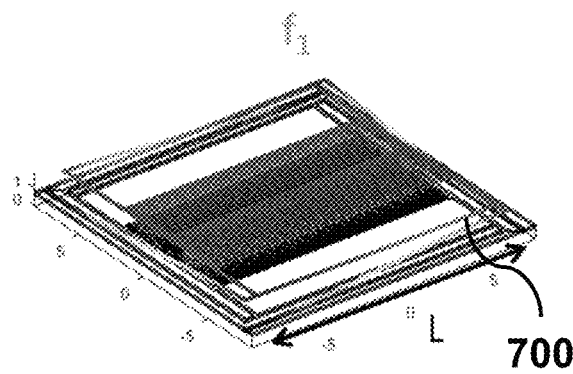
*Fig. 7B*
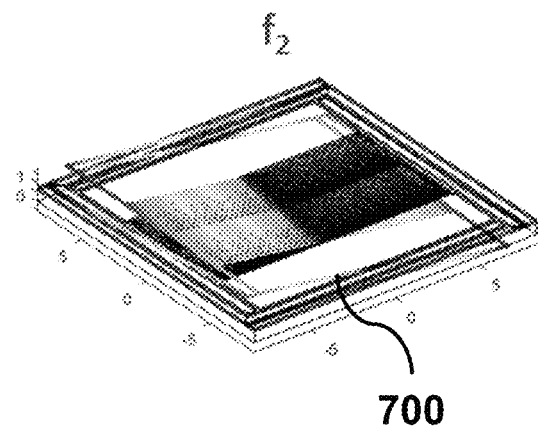
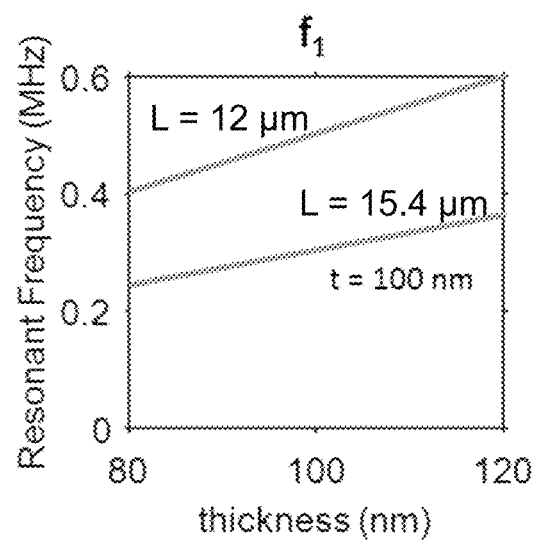
*Fig. 7C*

Fig. 8A
2° deflection
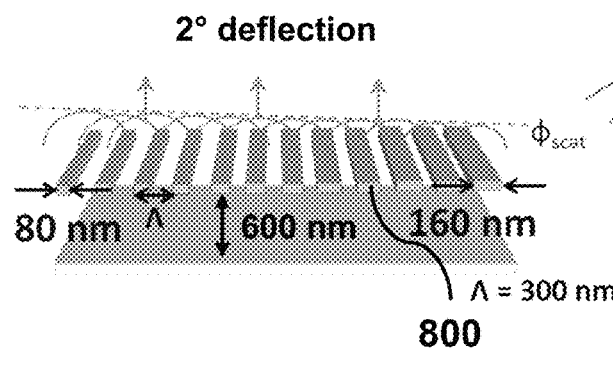
Fig. 8B
12° deflection
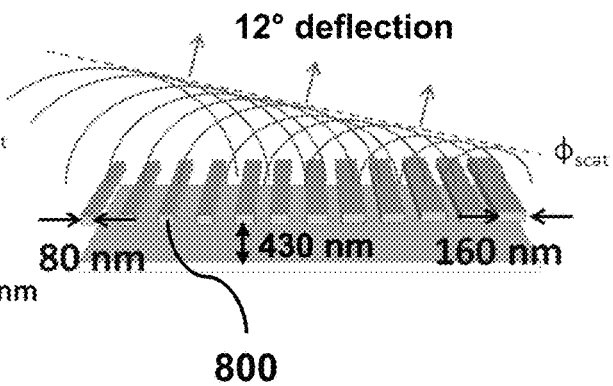
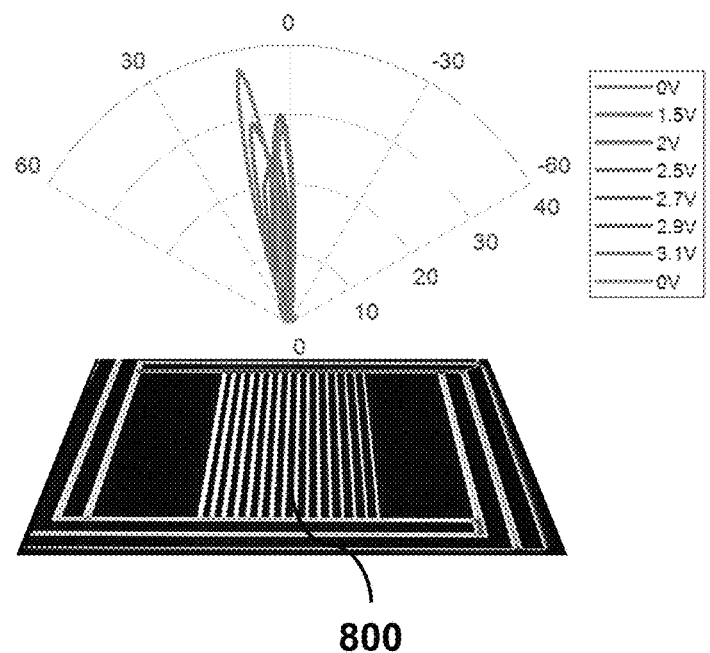
Fig. 8C

MEMS ACTUATED HIGH INDEX OPTICAL ANTENNAS AND METAFILMS FOR LIGHT MANIPULATION AND CONTROL

CROSS-REFERENCE TO RELATED APPLICATIONS

This application claims priority from U.S. Provisional Patent Application 62/486,742 filed Apr. 18, 2017, which is incorporated herein by reference.

STATEMENT REGARDING FEDERALLY SPONSORED RESEARCH OR DEVELOPMENT

This invention was made with Government support under contract FA9550-14-1-0389 awarded by the Air Force Office of Scientific Research. The Government has certain rights in the invention.

FIELD OF THE INVENTION

The present invention relates generally to devices and methods for manipulation and control of visible light. More specifically, it relates to optical metamaterials.

BACKGROUND OF THE INVENTION

Subwavelength, high-refractive-index nanostructures support optical resonances that endow such structures with optical antenna functions. These resonances have been engineered to enhance the volumetric absorption and scattering of light in various optoelectronic devices such as photodetectors, solar cells, and light emitters.

Most efforts have focused on tailoring the size and geometry of these structures to achieve various optical phenomena. In optimizing the modal properties for a specific application, the focus has primarily been on tailoring the deep subwavelength structure to maximize certain modal excitations and to fashion the near-fields inside the structure in a passive manner to achieve a desired function.

BRIEF SUMMARY OF THE INVENTION

The inventors have discovered how the manipulation of the photonic environment can control the scattering efficiency of high-index semiconductor nanowires. The presence of a substrate can modify the external fields of the wire and thus change the excitation efficiency of different multipolar resonances in a controllable and reproducible fashion. Light scattering can both be enhanced or suppressed. Near-complete suppression of scattering is consistent with the observation of surface selection rules for quantum objects. As opposed to quantum objects, high-index nanostructures exhibit broad resonances. For this reason, the fashioning of the environment can afford broadband tuning of optical phenomena across the entire visible spectrum, here shown for light scattering.

Based upon the discovery of the above principles, the inventors have designed an optical metamaterial in the form of an array of nanoantennas that are actively tuned by electrostatically changing their distance from a reflective substrate using MEMS. The device operates at visible wavelengths, provides localized phase control of individual elements, and is fabricated as a semiconductor on insulator. The substrate, electrode, and resonator are fabricated in a single film. The antenna is designed so that it can be moved to uniformly up and down.

Advantageously, semiconductor nanostructures display a variety of resonances at different wavelengths and polarizations. Their resonant scattering properties dependent differently on the height of the nanostructures above the reflective substrate. These differences can be utilized to actively control the local scattering phase.

Devices according to the principles of the invention may be implemented using a range of different semiconductors. The arrays can use a range of different patterns such as nanowires or any other interconnected structure, such as a grid of beams with undulations along the beam length.

The devices of the present invention advantageously enable low-power active manipulation of light (e.g., steering, scattering, wave front control) via electric biasing a single or an array of high-dielectric optical antenna(s). The devices have applications to actively controlled light manipulation including, low-power color display technology, free-space optical data communication, reconfigurable phased array optics, adaptive optics, metasurface-based optics, and various MEMS-based sensing technologies.

A key features of the invention is a design that enables controlling the excitation of optical resonances supported in high-index antennas by means of mechanical motion above a reflective substrate. Due to the capacitive nature of this actuation mechanism, it can operate at lower powers than other technologies and perform similar functions.

In one aspect, the invention provides a monolithic optical device for light manipulation and control, such as beam steering, focusing, and reflected color, at visible and infrared wavelengths. The device includes a device layer deposited on an sacrificial layer deposited on a reflective substrate. The device layer comprises an elastic support structure and nanoscale optical antenna elements, arranged such that the nanoscale optical antenna elements are capable of moving vertically in response to application of an electrostatic potential between the device layer and the reflective substrate. The sacrificial layer joins the elastic support structure to the reflective substrate. The reflective substrate is reflective at optical wavelengths, preferably with reflectivity at least 20%.

In some implementations, the elastic support structure is electrically conductive, or the elastic support structure comprises an electrically conductive deposited electrode layer. The reflective substrate may be a semiconductor, metal, or transparent conducting oxide, e.g., Si. The nanoscale optical antenna elements may be, for example, nanowires or nanobeams; they may be flat, tapered, angled, or rounded along their lengths. The nanoscale optical antenna elements have widths in the range of 10 to 250 nm, lengths in the range of 1 to 100 microns, and an index of refraction greater than 1.5. The device layer is separated from the reflective substrate by a distance in the range 0 to 2 microns. In some implementations, the device layer is a semiconductor, e.g., Si, Ge, GaAs, GaN, GaP, InP, $Fe_2O_3$, $Al_2O_3$, or the device layer may a dielectric material, e.g., $SiO_2$, $Si_3N_4$, $TiO_2$, in which case the device comprises metal contact pads deposited on top of the device layer. The sacrificial layer may be composed of a chemically-removable material, e.g., $SiO_2$, $Si_3N_4$, a photoresist material, an organic, a semiconductor. A metafilm device may comprise an array of such independently controllable devices, all fabricated into a single monolithic device.

BRIEF DESCRIPTION OF THE SEVERAL VIEWS OF THE DRAWINGS

FIG. 1B is a graph illustrating a topographic map of the projected height above the mirror of FIG. 1A.

FIG. 1C is a diagram illustrating light is incident on the mirror at an off-normal angle for the device of FIG. 1A.

FIG. 1D is a diagram illustrating a dark field collection scheme, where only diffracted light directly scattered and reflected off the mirror contributes to the far-field scattered light for the device of FIG. 1A.

FIG. 1E are images illustrating dark field scattering behavior for the device of FIG. 1A at various wavelengths.

FIG. 1F is a graph illustrating intensity vs. wavelength behavior for the device of FIG. 1A.

FIG. 2A is an illustration of a device similar to that of FIG. 1A, depicting a nanowire suspended above a mirror to demonstrate principles of the invention.

FIG. 2B is a diagram showing behavior of both TE and TM polarizations for the device of FIG. 2A.

FIG. 4 outlines the steps of a fabrication process for the device of FIG. 3A.

FIGS. 7A-7C illustrate details of a metamaterial elastic support structure and an associated graph of response frequencies in the MHz regime.

FIGS. 8A-8B are schematic views of the beam steering resulting from phase control of scattered light emerging from a periodic metasurface composed of multiple nanowires according to an embodiment of the invention.

FIG. 8C is an illustration of beam steering with deflection angles continuously sweeping according to an embodiment of the invention.

DETAILED DESCRIPTION OF THE INVENTION

High dielectric nanostructures support optical resonances that allow strong interaction with light in the visible spectrum. These resonances behave like electric and magnetic dipoles that can be independently excited based on the nature of the driving optical field. Whereas the impact of the size and geometry of dielectric optical antennas has been studied extensively, the impact of the local environment around such antennas has not been investigated in great detail. The inventors have discovered that, by controlling the optical environment that an antenna is in, a device can selectively excite these resonances to effectively control the optical response of the antenna(s). In particular, the optical environment the antenna inhabits can be controlled in a device by placing them close to a reflective substrate. The distance between the antenna and the substrate determines the optical environment the antenna inhabits due to the standing fields produced near the surface of the substrate. Therefore, by choosing the antenna size and by electrostatically controlling the height above the substrate, the optical properties of the antenna(s) can be actively controlled.

The inventors have discovered an alternative approach to actively tuning the optical response of nanostructures by controlling their photonic environment to enhance or suppress the interaction with selected modes. In particular, light scattering from semiconductor nanowires can be enhanced or suppressed when placed above a reflective surface due to the electric or magnetic dipolar nature of the relevant optical modes and demonstrate active tuning of the structural color across the visible with a nanoelectromechanical device designed to change the distance of a nanowire with respect to a reflective surface.

Figure 1A:
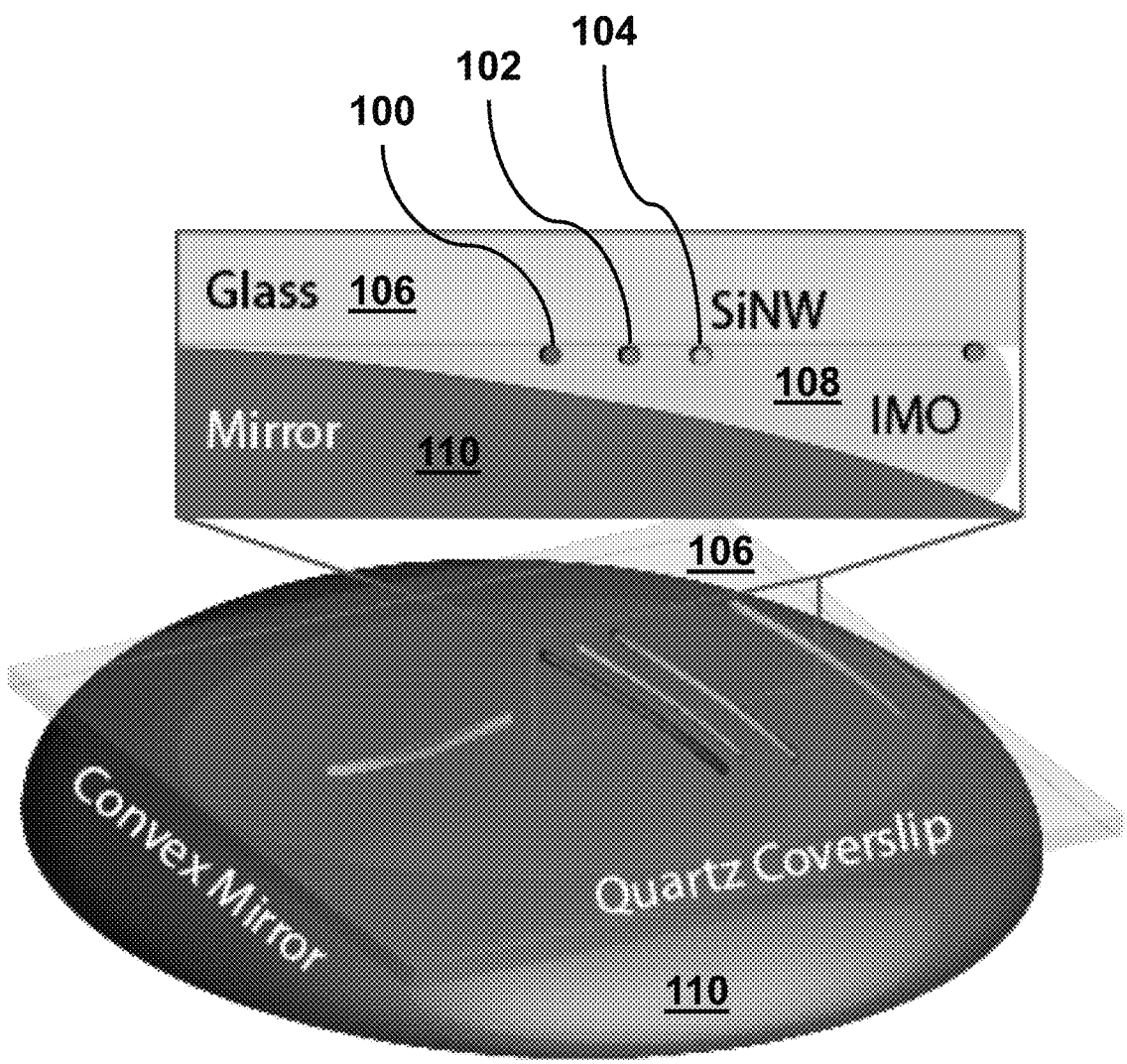
FIG. 1A is an illustration of a proof-of-concept device that demonstrates aspects of operation of embodiments of the invention.

FIG. 1A is an illustration of a proof-of-concept device that demonstrates aspects of operation of embodiments of the invention. Silicon nanowires 100, 102, 104 (SiNW) were grown by chemical vapor deposition and deposited on a quartz substrate 106. The SiNW were then suspended above an aluminum-coated plano-convex fused silica lens 110. This configuration affords nanometer-scale control over the height of the SiNW above the mirror 110 by sliding the quartz substrate 106 in the horizontal plane. This allows measurement of the optical scattering of silicon nanowires (SiNWs) above an aluminum mirror at different heights. An elevation profile of the mirror is mapped using Newton's rings resulting from the interference of monochromatic light between the air-glass interface and the mirror. The spacing of the interference fringes yields a topographic map of the projected height above the mirror, as shown in FIG. 1B. This intensity profile of the Newton's rings pattern was imaged at a wavelength of 500 nm and the corresponding height above the mirror was fitted to the minima of interference pattern.

The volume between the quartz slide 106 and mirror 110 is the filled with an index matching oil 108 to generate an isotropic dielectric environment, so that the SiNW can be considered "floating" from an optical perspective. The scattered light intensity from the wire is determined by the scattering efficiency of the nanowire, the excitation efficiency of the SiNW with an incident plane wave of intensity $I_O$, and the collection efficiency for the scattered light in the direction θ. When light is incident on the mirror at an off-normal angle φ, a standing wave is created with a node-to-node distance of $\lambda/(2 \cos(\varphi))$ as illustrated in the diagram of FIG. 1C. In a dark field collection scheme, only diffracted light directly scattered and reflected off the mirror contributes to the far-field scattered light as shown in FIG. 1D. These two pathways interfere with each other giving rise to a standing field in the collection scheme which can be modeled analytically. If the mirror is treated as a perfect electric conductor, the enhancements in the electric and magnetic field components parallel to the surface of the mirror are:

$$E_{FE,\|} = -4 \sin(kh \cos(\varphi))\sin(kh \cos(\theta)) \quad (1)$$

$$H_{FE,\|} = 4 \cos(kh \cos(\varphi))\cos(kh \cos(\theta)) \quad (2)$$

Where h is the center height above the mirror, k is the vacuum wavenumber for light incident at an angle $\phi$ and collected from the angle $\theta$. Neglecting the presence of and near-field interaction between the nanowire and substrate, the far-field intensity normal to the mirror becomes:

$$\frac{I^{ff}(r,\phi)}{I_o} = \frac{2}{\pi k r} \begin{cases} \left| H_{FE,\parallel} a_o - 2E_{FE,\parallel} \sum_{m=1,3,\ldots} \cos(m\phi) a_m + \right. \\ \left. 2H_{FE,\parallel} \sum_{m=2,4,\ldots} \cos(m\phi) a_m \right|^2 \text{TE} \\ \left| E_{FE,\parallel} b_o - 2H_{FE,\parallel} \sum_{m=1,3,\ldots} \cos(m\phi) b_m + \right. \\ \left. 2E_{FE,\parallel} \sum_{m=2,4,\ldots} \cos(m\phi) b_m \right|^2 \text{TM} \end{cases} \quad (3)$$

where $I_O$ is the incident intensity, m is an integer, $a_m$ or $b_m$ is the Mie coefficient of a cylindrical wire in free space, $\varphi$ is the incident angle, r is the observation distance, $\theta$ is the collection angle, and the TE and TM polarizations have the incident electric and magnetic fields perpendicular to the SiNW axis respectively. It is insightful to note that if the field enhancement terms were removed from Eq. (3), then the expression for free space scattering from a nanowire would be recovered. From this model, it is clear that the total scattered light intensity from the nanowire is approximated by the beating pattern of the excitation and collection plane waves, which gives rise to a composite driving field profile which is then multiplied by the Mie coefficient. For visible light scattering from SiNWs with diameters around 100 nm, the relevant Mie resonances are described by the $a_0$, $a_1$, $b_0$, and $b_1$ coefficients. When a SiNW with a diameter of 50 nm is brought near the mirror, vibrant colors emerge in the dark field scattering images of the nanowire as its height above the mirror is changed by only a few hundred nanometers as shown in FIG. 1E. At a distance of 20 μm from the mirror, the nanowire appears a yellow-gold color similar to its appearance in free space due to the $b_0$ resonant mode. But when brought near the mirror, the peak wavelength from this mode can be tuned across the entire visible spectrum as shown in FIG. 1F.

In order to study the selective excitation of the first two Mie resonances for both polarizations at a range of heights, a 105 nm wide square SiNW was lithographically defined using electron beam lithography and reactive ion etching on a quartz substrate. The 100 μm long nanowire 200 was immersed in index matching oil and similarly suspended above a plano-convex mirror 202 as shown in FIG. 2A. The experimental setup shows the dark field illumination from a plane normal to the nanowire axis. The incident light traverses through a quartz carrier wafer to diffract off a lithographically defined SiNW using a 0.7 NA objective. The spectra are collected at normal incidence.

Figure 2C:
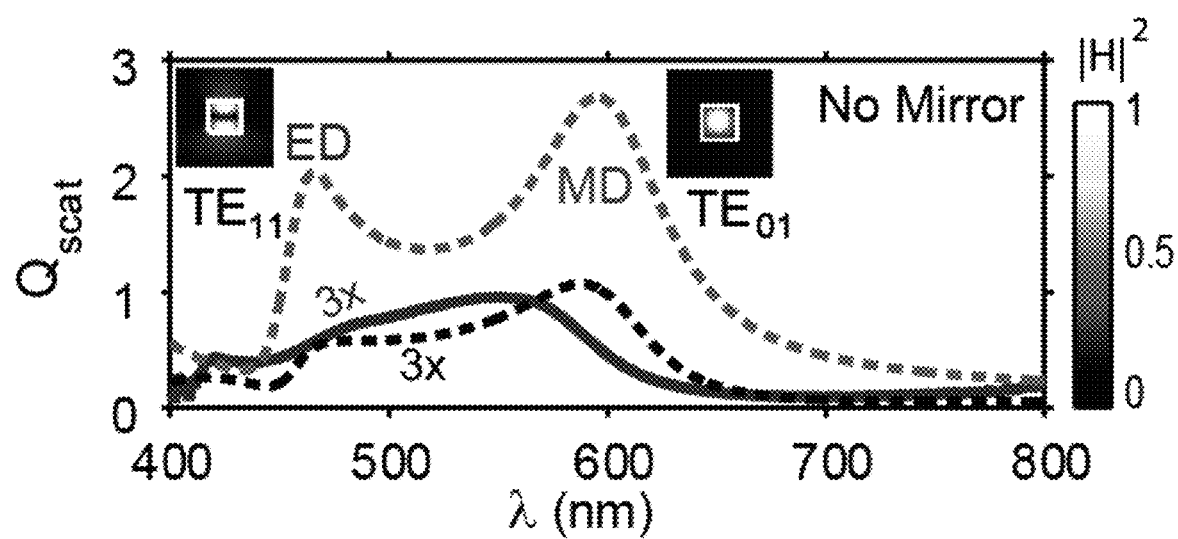
FIGS. 2C and 2D show the experimental and simulated scattering efficiencies without the mirror present for both TE and TM polarizations for the device of FIG. 2A.
Figure 2D:
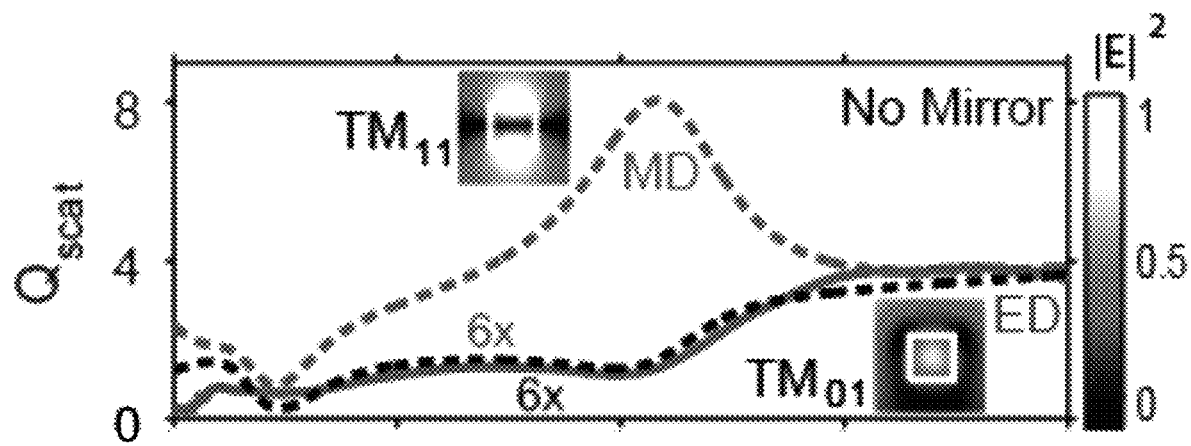

Light was illuminated from a slit at an incident angle of 39° to the collection axis for both TE and TM polarizations as shown in FIG. 2B. FIGS. 2C and 2D show the experimental and simulated scattering efficiencies ($Q_{SCA}$) from the SiNW without the mirror present for both TE and TM polarizations respectively. This FDTD simulation of the total scattering cross section is collected at all angles $\varphi$ (grey dotted line) with the electric and magnetic field profiles on resonance (insets) for both polarizations. The experimentally collected scattering spectrum (solid lines) and the corresponding FDTD simulated differential scattering efficiency collected in the NA of the objective through the quartz handle wafer. The insets show the field magnitude maps for each resonance labelled as either electric dipole-like (ED) or magnetic dipole-like (MD). The grey dotted line is the simulated scattering efficiency for all scattering angles, while the black dotted line is the differential scattering efficiency integrated over the collection angles of the objective. We find that the latter matches the experimental scattering spectra significantly better than the all-angles scattering efficiency, indicating the importance of accounting for the anisotropic scattering from the SiNWs. The peaks in the total scattering efficiency are the spectral locations of the supported Mie resonances with the simulated magnetic and electric field magnitudes shown for the nanowire cross sections. These field maps highlight the dipolar nature of the Mie modes where the $a_1$ and $b_0$ modes behave like electric dipoles (ED) oriented along the nanowire axis. Similarly, the $a_0$ and $b_1$ modes behave like magnetic dipoles (MD) oriented along the nanowire axis.

Figure 2E:
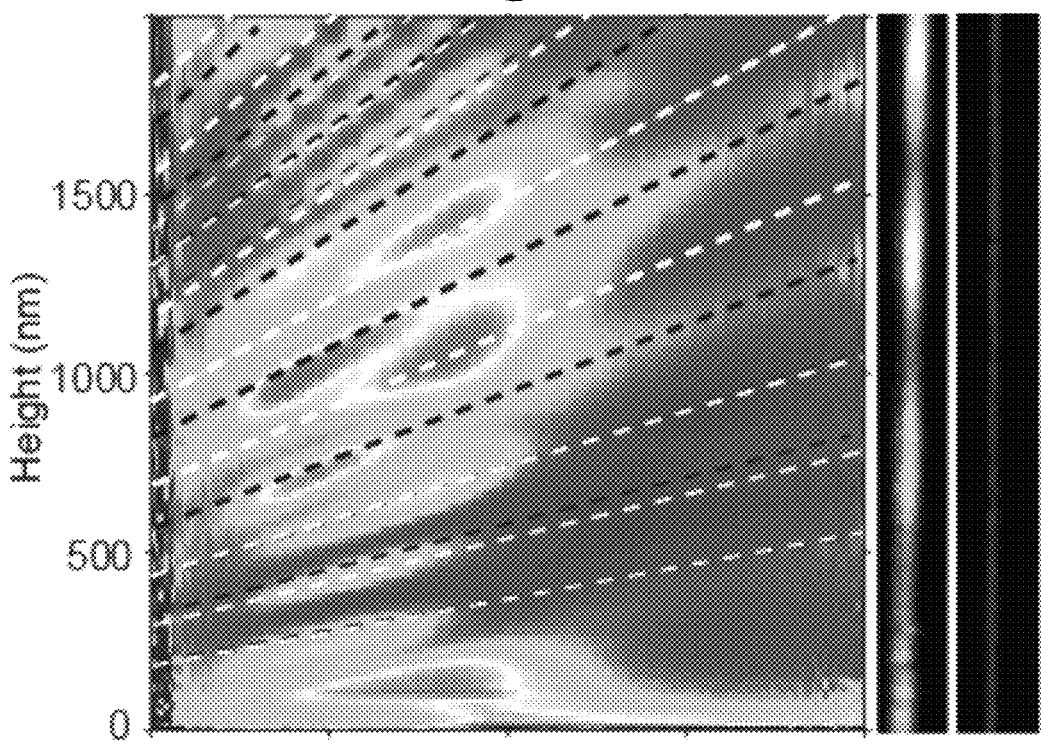
FIGS. 2E and 2F are images of light scattering behavior for both polarizations for the device of FIG. 2A.
Figure 2F:
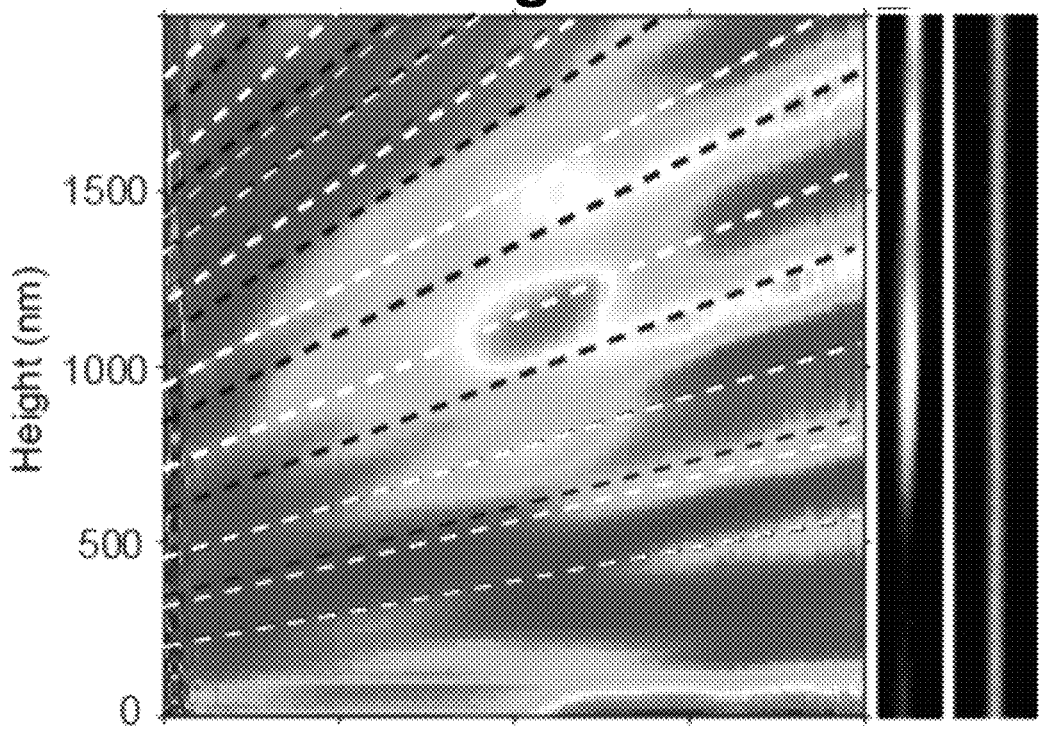

In previous work examining the nature of these low order Mie resonances, these modes have been simultaneously excited, but here we demonstrate that by tailoring the local field profile within a standing field, the electric and magnetic dipolar resonances can be independently excited. The local field profile can be controlled by changing the height of the nanowire or the angle of incident illumination. Here we change the SiNW height by use of the convex mirror surface which can be approximated as a planar sloped surface for the incident angles used in experimentation. When brought into contact with the mirror and dispersed via a grating, the light scattering spectrum at heights spanning 0 to 2000 nm is observed for both polarizations as shown in FIGS. 2E and 2F. Experimentally collected light scattering spectra are shown at heights ranging from 0 to 2000 nm for both polarizations. Dark field images of the nanowire vertically scaled to compensate for the parabolic shape of the mirror are shown to the right of each plot. The simulated electric (black) and magnetic (white) field maxima are overlaid with the line width corresponding to the magnitude of the field maxima.

Figure 2G:
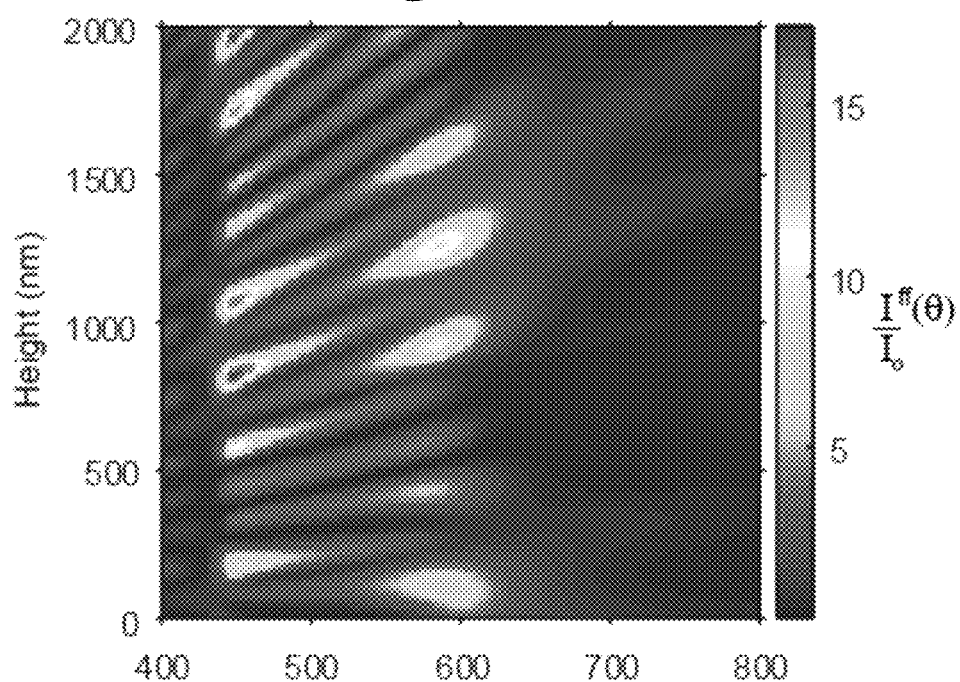
FIGS. 2G and 2H are images showing the analytically derived model of far-field diffracted light scattered from a nanowire above an aluminum mirror for both polarizations for the device of FIG. 2A.
Figure 2H:
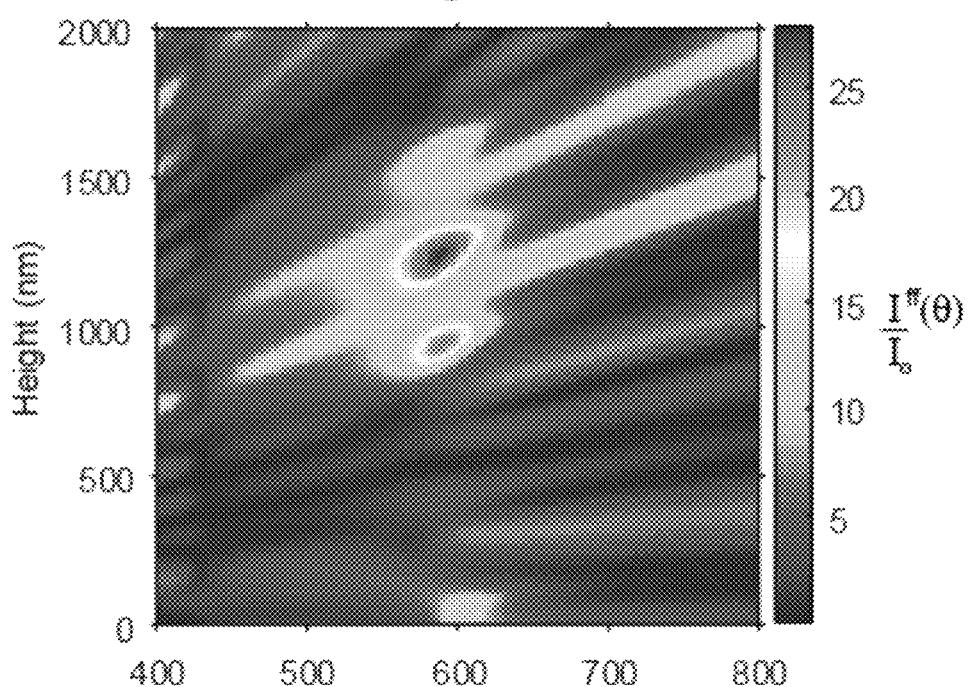

The corresponding dark field images are shown next to the plots when brought above the mirror (left insets) showing the structural color variation as compared to the case without the mirror (right insets). For both polarizations, the wavelengths of highest collected intensity correspond to the peak wavelengths for the Mie resonances, but are excited at specific heights above the mirror. When the maximum in the electric and magnetic fields given by the simulated composite standing field profile are overlaid on the experimental light scattering plot, the separation of the electric and magnetic dipole modes is evident with height. The solution to this experimental configuration has been solved analytically, shown in FIGS. 2G and 2H, illustrating the analytically derived model of far-field diffracted light scattered from a SiNW above an aluminum mirror for both polarizations. The resulting far field angular intensity has excellent correspondence to the experimental and simulation results. The analytically derived scattering from a SiNW above a mirror allows the modified Mie coefficients $c_m$ to be determined for a given illumination angle which is dependent upon the height above the mirror and different from the free space Mie coefficients.

The mirror and nanowire together act as an asymmetric leaky Fabry-Perot cavity and exhibit a Purcell-like enhancement in light scattering from the nanowire similar to a classical driven dipole oscillator within a resonant cavity. When the total scattered power with the mirror present is normalized by the total scattered power in free space, a Purcell-like enhancement is observed for each mode order m:

$$P_{m=0}^{TE} \cong [1 + J_0(2kh)] \frac{|H^{ext}|^2}{|H^{fs}|^2} \quad (2\text{-}5)$$

$$P_{m=\pm 1,1}^{TE} \cong [1 + J_2(2kh)] \frac{|E^{ext}|^2}{|E^{fs}|^2}$$

$$P_{m=0}^{TM} \cong [1 - J_0(2kh)] \frac{|E^{ext}|^2}{|E^{fs}|^2}$$

$$P_{m=\pm 1,1}^{TM} \cong [1 - J_2(2kh)] \frac{|H^{ext}|^2}{|H^{fs}|^2}$$

where J is the Bessel function of the first kind, $E^{ext}$ and $H^{ext}$ are exciting field magnitudes produced above the mirror incident and reflected light off the mirror of the form $$|H^{ext}|^2 = 4|H^{fs}|^2 \cos^2 [kh \cos(\phi)]$$

and $$|E^{ext}|^2 = 2|E^{fs}|^2 \{\sin^2 [\phi + kh \cos(\phi)] + \sin^2 [\phi - kh \cos(\phi)]\}$$

for the TE polarization, and $E^{fs}$ and $H^{fs}$ are the incident fields in free space case. For selected heights, the presence of the mirror enhances the total scattered power more than five times for m=0 and more than twice for m=±1 modes as compared to the free space condition for both polarizations. This enhancement in the scattering efficiency from the nanowire near the mirror includes all scattering angles, but when only one far-field direction is chosen, even further enhancement can be achieved. In the normal direction, the far-field approaches an enhancement of 32 for TM illumination due to the four-fold enhancement in the electric fields arising from interference from the incident and collection standing fields driving doubly-degenerate $b_1$ mode (see Eq. (1)).

Figure 3A:
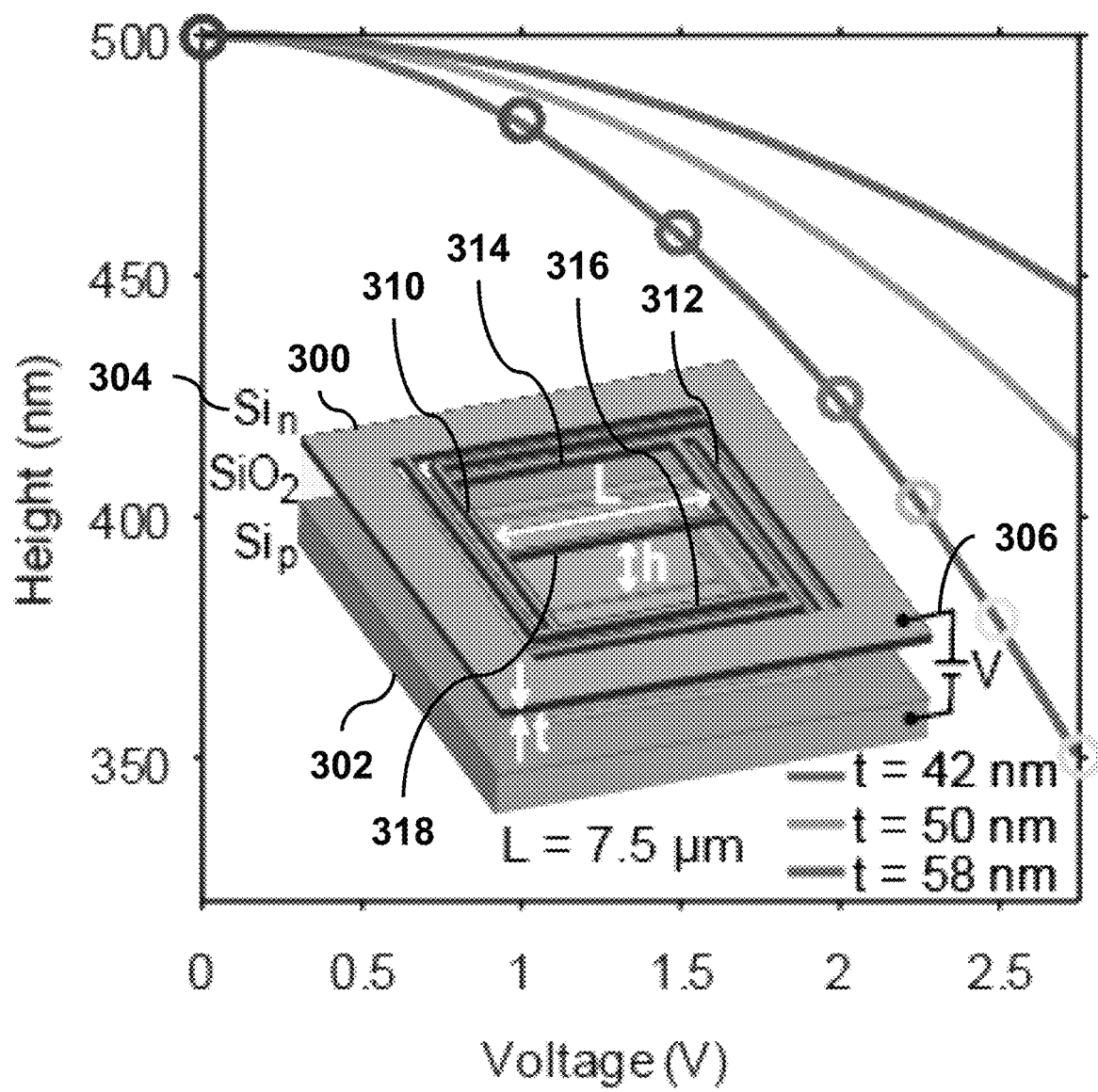
FIG. 3A is a composite of a device according to an embodiment of the invention and a graph of nanowire height vs applied voltage bias.

Based on the physical principles described above, the inventors have designed a class of devices that provide active tuning of light scattering across the visible spectrum. One embodiment of such a device is shown in FIG. 3A, which details one independently controllable pixel of the device array. This SOI-based MEMS device achieves broadband tuning across the visible spectrum. Simulation of the mechanical pull-in behavior of a MEMS cage supporting a SiNW is illustrated by the superimposed graph. Three different cage thicknesses are shown. The circles correspond to the heights used. The inset shows the layout of the device with a suspended cage fabricated on an SOI wafer. The buried oxide thickness is 650 nm. The device is comprised of a lithographically patterned dielectric or semi-conducting layer 300 suspended above a reflective substrate 302 with potential heights ranging from 0 to 2 μm. This dielectric or semi-conducting layer 300 could potentially be made of any electrically conducting layer exhibiting optical resonances for nanostructured antennas such as silicon, germanium, gallium arsenide, gallium nitride, silicon oxide, titanium oxide, silicon nitride, etc. Rather than having multiple layers for each function, the dielectric or semi-conducting layer 300 in some embodiments serves the triune purpose of being the top electrode, elastic support material, and optically active layer. The unbiased height of the dielectric or semi-conducting layer above the reflective layer (which could be metallic, semiconducting, or even a transparent conducting oxide) is dependent upon the thickness of the under-etched sacrificial layer 304.

The height of the dielectric or semi-conducting layer 300 above the mirror 302 is dynamically controlled by applying a voltage bias 306 to the dielectric or semi-conducting layer enabling an electrostatic force to pull the layer 300 toward the reflective substrate 302. If it is desirable to enable a constant change in the height as of function of applied bias, the support flexural arms 310, 312, 314, 316 within the dielectric or semi-conducting layer should be symmetric (i.e. a double- or greater-clamped geometry). The widths and thicknesses of the nanowires 318 within the dielectric or semi-conducting layer 300 can demonstrate unique optical functionality within the range of 10 to 250 nm. Typical devices utilize nanowire lengths from 5 to 25 μm, but could be larger depending upon the size of the desired actively controlled pixel. The optical performance of the device is dependent upon both the geometric design and illumination configuration. The geometric design is comprised of the size and arrangement of the nanostructures in the semi-conducting layer as well as the spacing of the layer from the reflective substrate which determines the overall movable ("stroke") distance of the device. The illumination configuration is taken into account when considering the overall design of the device in order to achieve a desired optical functionality. The excitation angle(s) and observation angle(s) will change the optical function of the device under both static and dynamic operation.

Figure 3B:
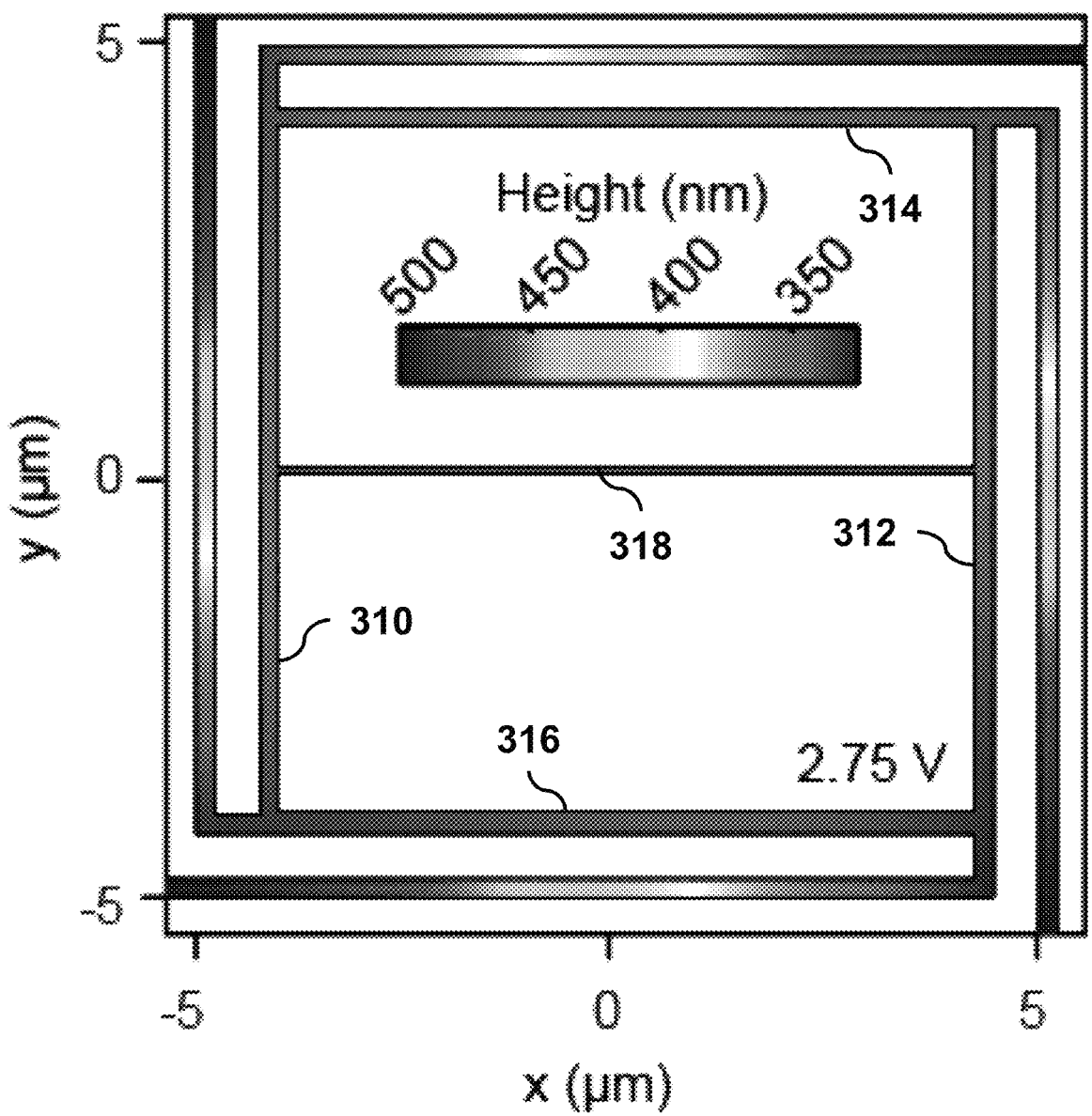
FIG. 3B is a top view of the device of FIG. 3A.

The embodiment of FIG. 3A achieves active tuning of the light scattering across the visible spectrum using a SiNW 318 fabricated within a lithographically defined and under-etched frame on a silicon-on-insulator wafer. An applied bias between the device and handle layers actuates the nanowire 318 toward the silicon mirror surface 302. The support structure for the nanowire is designed with tangential supports 310, 312, 314, 316 to allow the nanowire to have an even height above the mirror across its length and achieve a stroke distance of 150 nm at 2.75 V. FIG. 3B is a top view of the MEMS device showing the simulated pull-in behavior across the cage for a device layer thickness of 35 nm at an applied bias of 2.75 V to the cage while the handle wafer is held at ground. As previously shown, the broad $TM_{01}$ mode is ideal to provide spectral tuning across the visible due to its low quality factor resonance.

Figure 3C:
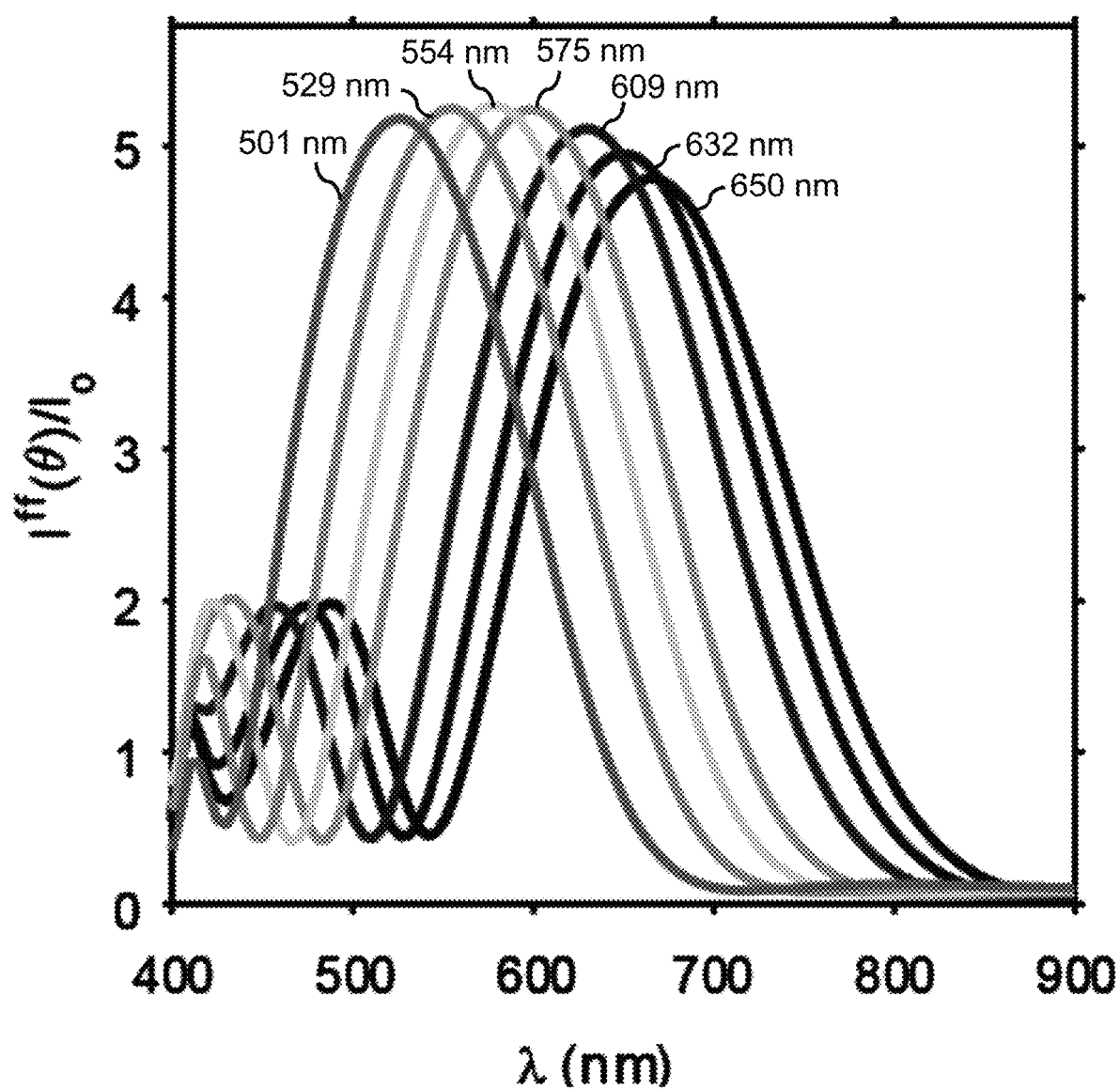
FIG. 3C is a graph of the calculated far-field scattering for a range of wavelengths for the device of FIG. 3A.

FIG. 3C shows the calculated far-field scattering sweeping from 670 to 525 nm for a SiNW with a radius of 28 nm when a height modulation of 150 nm is applied. This analytic solution of light diffracted from a SiNW normal to the substrate shows broadband tuning across the visible spectrum with various heights. The radius of the nanowire was 28 nm with an incident illumination angle of 63° to the substrate normal in the plane normal to the nanowire axis.

This structure was fabricated using electron beam lithography (EBL) and released the cage with vapor HF. The dark field scattering from the same device shows a uniform color along its length indicating constant width of the nanowire and height above the mirror. For low voltages, we are able to tune the single scattering peak across a large part of the visible spectrum from 700 nm to 520 nm. As long as the displacement is less than one third the thickness of the buried oxide layer, the device can be reversibly tuned for many cycles while maintaining the same peak wavelength and scattering intensity. If the device is driven beyond a third of the initial gap distance, non-reversible pull-in is observed. If we choose a spectral location on the shoulder of one of the resonances, a modulation ratio of 10 dB in the scattering intensity can be achieved.

The device was fabricated as follows. The SiNWs were prepared via gold colloid-catalyzed chemical vapor deposition process or lithographically defined by electron beam lithography (EBL) and reactive ion etching (RIE) of a low pressure physical vapor deposited (LPCVD) polysilicon layer on quartz. The light scattering measurements were carried out using darkfield optical microscopy. A true-color CCD (Nikon) and a spectrometer (Acton 2300i, SpectraPro) with a cooled CCD (Princeton Instruments, Pixis 1024) were used to capture the images and acquire the scattered spectra. The NWs were illuminated with an incident beam of polarized white light from a halogen lamp after passing through an entrance slit and was focused on the sample at an angle of ~63° or ~39° (if a top quartz wafer was used to support the NW) via a dark field objective. The scattered light was collected normal to the substrate using the same dark field objective (Nikon NA 0.8, 50×). The camera was used to capture images of NWs and the spectrometer was used to acquire quantitative spectral information on the light scattering from a consistent location on the NW at various heights using a confocal collection scheme. Spectral data was normalized by subtracting the CCD dark counts from the experimental spectrum, then the difference was divided by the spectrum of the halogen lamp collected from a Lambertian dark field 99% reflective reference standard (Labsphere SRS-99-010). The height of the nanowire above the mirror was controlled by sliding the quartz substrate perpendicular to the collection direction after the quartz slide had contacted the top of the plano-convex mirror. For the actively tuned device, the nanowire and support cage were lithographically defined via EBL and RIE on a doped silicon-on-insulator (SOI) wafer. The NW and support cage were under-etched and released using hydrofluoric acid vapor. The FDTD simulations were carried out using Lumerical software, the finite element electro-mechanical simulations were performed using COMSOL with the MEMS module.

The steps of a fabrication process are shown in FIG. 4. Step 400 begins with a 400 nm Si device layer deposited on a 400 nm SiO2 sacrificial layer which in turn is deposited on a silicon wafer. Wet oxidation step 402 results in creation of a thermal oxide layer on the Si device layer, followed by wet etching step 404 resulting in a 115 nm thick Si device layer. A spin coat step 406 followed by e-beam exposure step 408, RIE poly-etch step 410 and resist strip step 412 forms the structure of the device layer. Next, a vapor phase HF etch step 414 removes most of the sacrificial layer, exposing the underlying silicon wafer and leaving only peripheral supports connecting the wafer and the device layer. The final device design in profile is shown as the final step 416.

Figure 5:
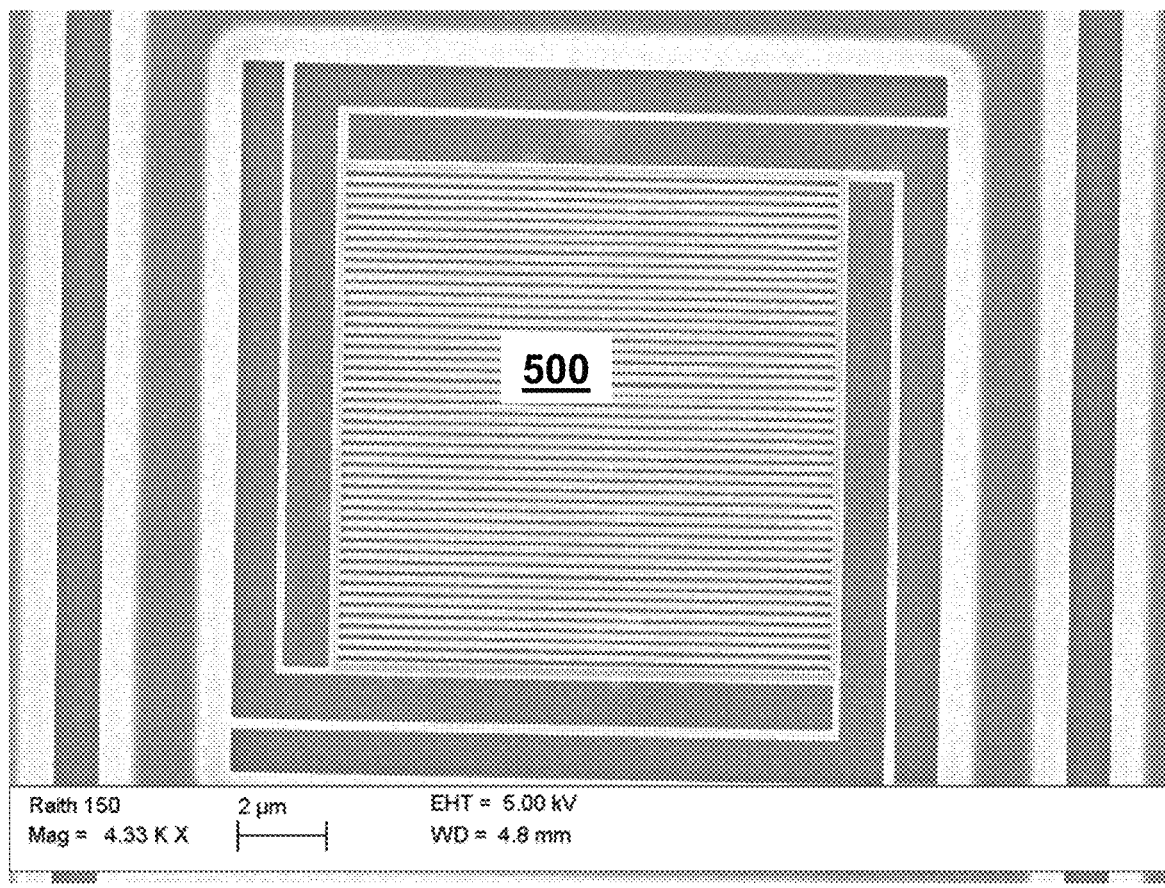
FIG. 5 is an image of the device layer of an embodiment of the invention.

FIG. 5 shows the device layer of an embodiment of the invention comprising multiple nanoscale antenna elements 500 in the form of parallel nanowires. In alternate embodiments, the elements may be nanobeams or other nanoscale elements of various shapes. The elements may have a cross sectional size and shape that can vary along the length of the wire or beam, grid or an interconnected network of nanoparticles to achieve a wide variety of applications afforded by control of both the amplitude and phase of scattered light from the metasurface layer.

Figure 6A:
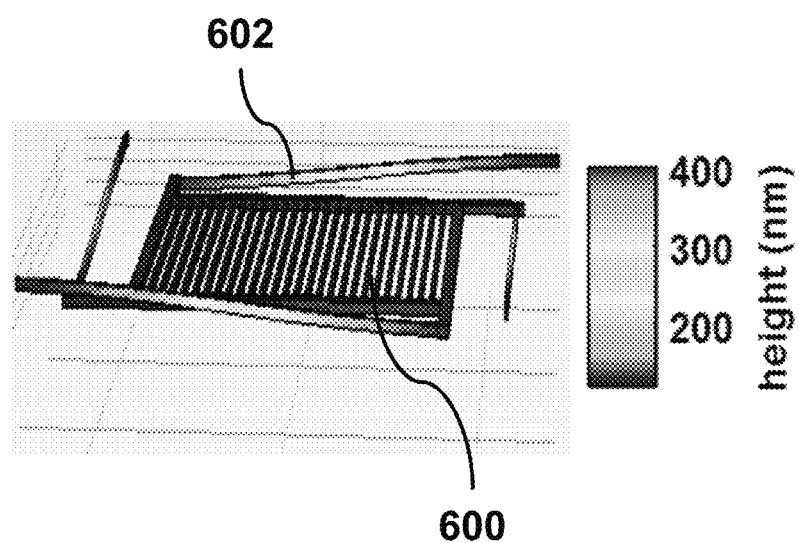
FIGS. 6A-6B are images of a device according to an embodiment of the invention.
Figure 6B:
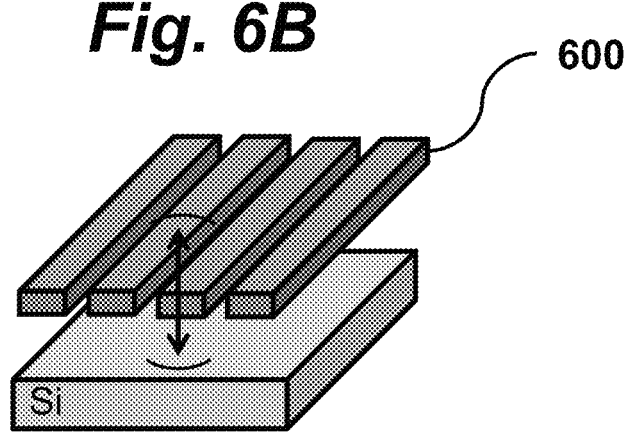
Figure 6C:
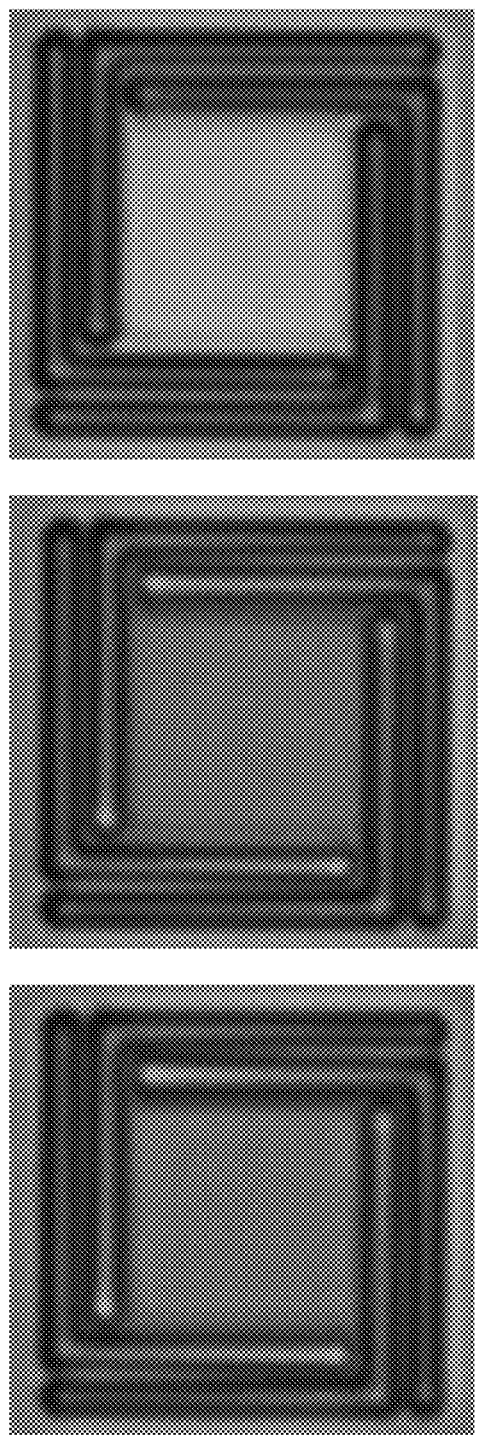
FIG. 6C are images illustrating wavelength dependent behavior of a device as applied voltage bias changes, according to an embodiment of the invention.

By pattering silicon nanowires 600 with a sub-wavelength periodicity within one of the MEMS frames 602, as shown in FIGS. 6A-B, color-tunable pixels in bright-field reflection is achievable. FIG. 6C shows the same pixel under three biasing conditions that show the dramatic color tuning for TM polarized light. Many of these devices could be patterned to make a pixelated reflective display.

Figure 7D:
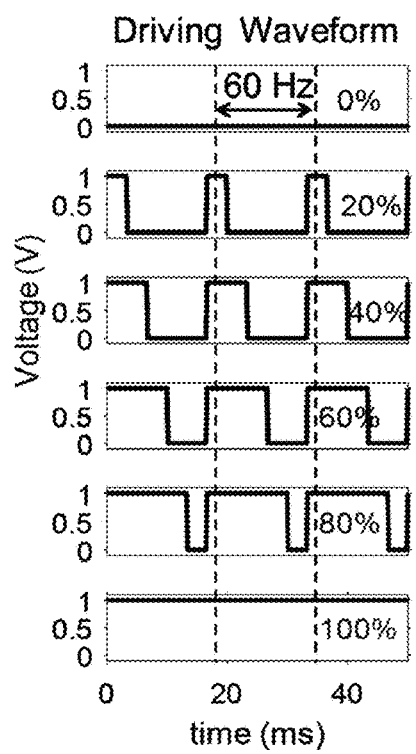
FIGS. 7D-7E illustrate wavelength mixing behavior of a device in response to changing the duty cycle of a square wave driving voltage.
Figure 7E:
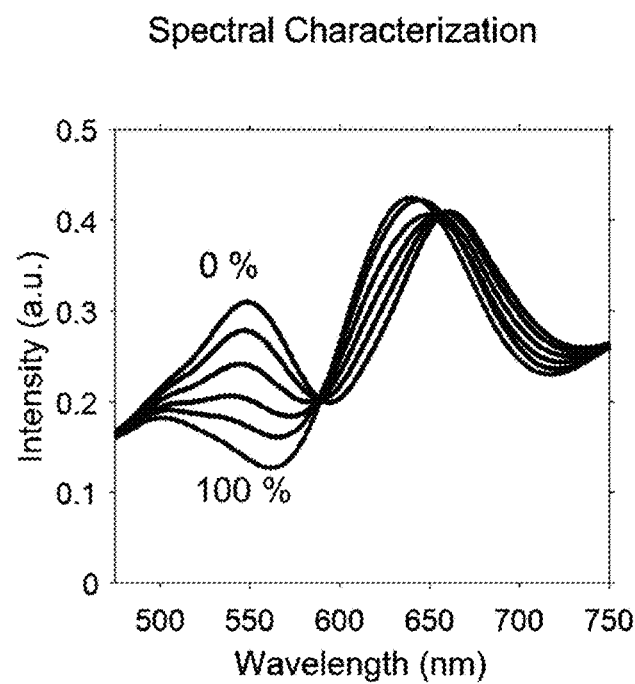

The metamaterial's elastic support structure 700 can be designed to have a large mechanical stiffness to give response frequencies in the MHz regime, as illustrated in FIGS. 7A-7C. The high frequency response of the MEMS structure also allows many potential applications for this invention. Global optical interconnect couplers and display devices for example rely upon MHz switching speeds and display technologies utilize lower frequencies up to 120 Hz. As an example of a potential application to a color switching display pixel we can use pulse-width modulated signals to achieve color mixing between to different resonant states of a metasurface device. By changing the duty cycle of a 60 Hz square wave, we can blend the color of a pixel between two different color states, as shown in FIGS. 7D-7E. The spectral characterization reveals that when only two different colors are present, by changing the duty cycle, a linear combination of the colors can be mixed. If a third scattering peak existed at an intermediate height, then both pulse width modulation and amplitude modulation could together enable color mixing across an area of the color gamut.

In addition to achieving actively controllable optical functionality in the amplitude or color of the reflected light from the invention comprised of repeated nanowires within an electrostatically movable frame, by varying the width of the nanowires within a single device, the reflection phase of the scattered light can be modulated as well to enable active beam steering. The schematic shown in FIGS. 8A-8B shows the beam steering resulting from phase control of scattered light emerging from a periodic metasurface composed of multiple nanowires 800 with nanowire widths spanning 80 to 160 nm under biasing conditions affording heights ranging from 600 to 430 nm. Fourier imaging allows the beam steering to be measured from the invention. A similar fabricated device shows beam steering with deflection angles continuously sweeping from 2° to 12° a beam width full-width-half-max of about 10° as shown in FIG. 8C. As the width of the device decreases, the phase progression at the maximum difference in relative phase is more rapid, leading to larger deflection angles. This occurs at the cost of having a larger spread in the width of the scattering angles due to diffraction. Therefore repeating the nanowire array multiple times in a single device enhances the ratio of beam directivity to beam width.

Figure 9:
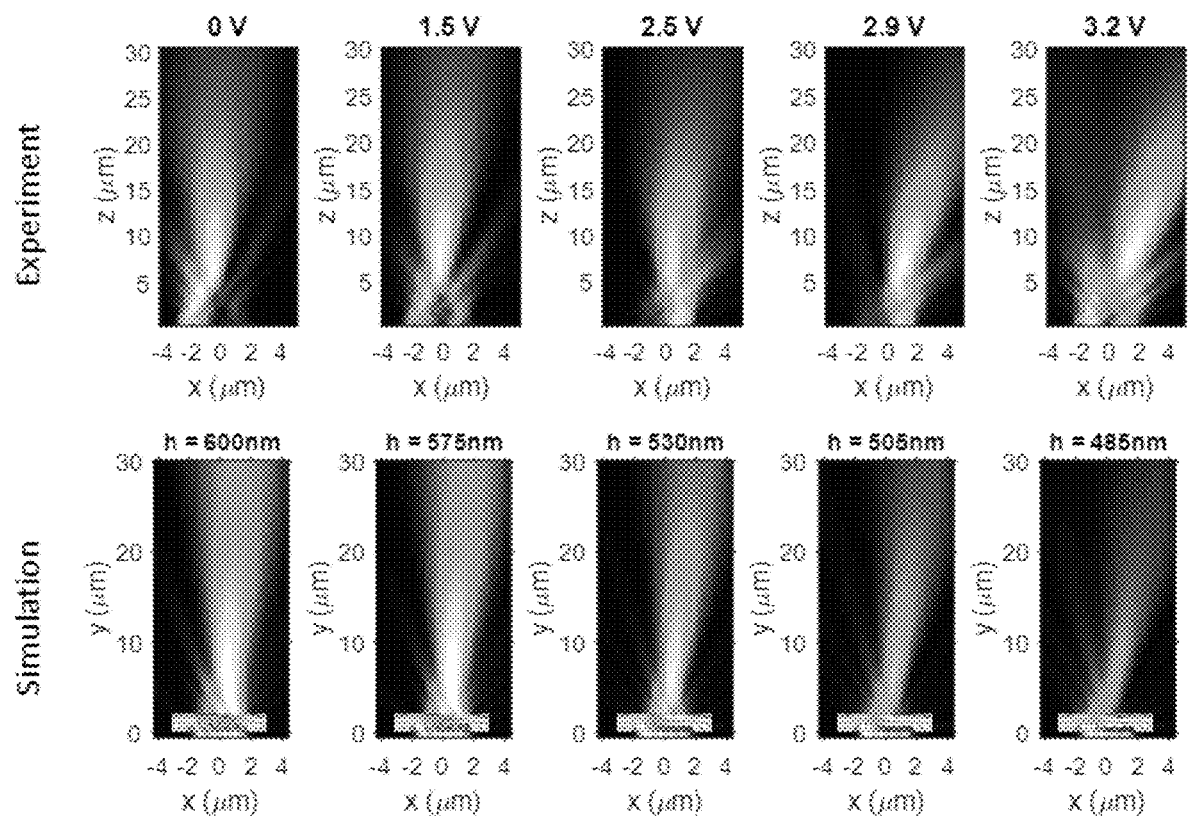
FIG. 9 shows both the experimental and simulated intensity profiles of the device shown in FIG. 8A.

In addition to examining the Fourier images to characterize the beam steering of the device, z-stacks taken with conventional microscopy imaging reveal the intensity profile near the surface of the active metasurface. FIG. 9 shows both the experimental and simulated intensity profiles of the device shown in FIG. 8A. The intensity profiles nicely show the active metasurface acting as a phased antenna array to direct a beam. Here modest voltages less than 3.2 V are applied to the suspended nanowire array to induce this steering.

Based on the principles and illustrative examples described above, those skilled in the art will appreciate that there are a number of possible variations encompassed within this invention that could be utilized to achieve the same optical effects. One variation, for example, is the use of a photo- or thermal-activated polymer to cause the optical antenna displacement. Another variation would modify the refractive index of a spacer or imbedding medium under or around the optical antenna(s) in order to effectively change propagation distance between the antenna(s) and reflector.

The invention claimed is:

1. A monolithic optical device for light manipulation and control such as beam steering, focusing, and reflected color at visible and infrared wavelengths, the device comprising:
    a device layer deposited on an sacrificial layer deposited on a reflective substrate, wherein:

the device layer comprises i) an elastic support structure having an electrostatically movable frame and ii) nanoscale optical antenna elements arranged within the electrostatically movable frame, wherein the electrostatically movable frame and the nanoscale optical antenna elements are capable of moving vertically relative to the reflective substrate in response to application of an electrostatic potential between the device layer and the reflective substrate such that each of the nanoscale optical antenna elements has an even height above the reflective substrate along its length;

the sacrificial layer joins the elastic support structure to the reflective substrate;

the reflective substrate is reflective at optical wavelengths.

2. The monolithic optical device of claim 1 wherein the elastic support structure is electrically conductive.

3. The monolithic optical device of claim 1 wherein the elastic support structure comprises an electrically conductive deposited electrode layer.

4. The monolithic optical device of claim 1 wherein the reflective substrate is a semiconductor, metal, or transparent conducting oxide, e.g., Si.

5. The monolithic optical device of claim 1 wherein the nanoscale optical antenna elements are nanowires, nanobeams.

6. The monolithic optical device of claim 1 wherein the nanoscale optical antenna elements are flat, tapered, angled, or rounded along their lengths.

7. The monolithic optical device of claim 1 wherein the nanoscale optical antenna elements have widths in the range of 10 to 250 nm, and lengths in the range of 1 to 100 microns.

8. The monolithic optical device of claim 1 wherein the nanoscale optical antenna elements have an index of refraction greater than 1.5.

9. The monolithic optical device of claim 1 wherein the device layer is separated from the reflective substrate by a distance in the range 0 to 2 microns.

10. The monolithic optical device of claim 1 wherein the device layer is a semiconductor.

11. The monolithic optical device of claim 1 wherein the device layer is a dielectric material, and wherein the device comprises metal contact pads deposited on top of the device layer.

* * * * *